United States Patent
Yang et al.

(10) Patent No.: US 8,482,391 B2
(45) Date of Patent: Jul. 9, 2013

(54) WALL CONTROL INTERFACE WITH PHASE MODULATION AND DETECTION FOR POWER MANAGEMENT

(75) Inventors: Ta-Yung Yang, Milpitas, CA (US); Jenn-Yu G. Lin, Taipei Hsien (TW); Yi-Chi Lin, Taichung (TW); Cheng-Chi Hsueh, Taipei County (TW)

(73) Assignee: System General Corp., New Taipei (TW)

( * ) Notice: Subject to any disclaimer, the term of this patent is extended or adjusted under 35 U.S.C. 154(b) by 1197 days.

(21) Appl. No.: 12/346,901

(22) Filed: Dec. 31, 2008

(65) Prior Publication Data
US 2010/0123449 A1 May 20, 2010

Related U.S. Application Data

(60) Provisional application No. 61/199,835, filed on Nov. 19, 2008.

(51) Int. Cl.
*G05B 11/01* (2006.01)

(52) U.S. Cl.
USPC .......... 340/12.32; 340/12.33; 340/13.1; 340/13.23; 375/260; 375/271; 370/210; 370/215

(58) Field of Classification Search
USPC .................. 340/10; 375/268, 288, 300, 322, 375/324, 340
See application file for complete search history.

(56) References Cited

U.S. PATENT DOCUMENTS

2001/0008391 A1* 7/2001 Yuasa .................. 340/310.01

* cited by examiner

*Primary Examiner* — Tai T Nguyen
*Assistant Examiner* — Ojiako Nwugo
(74) *Attorney, Agent, or Firm* — Jianq Chyun IP Office

(57) ABSTRACT

A wall control interface for power management includes a transmitting circuit that generates a switching signal to control a switch and achieve a phase modulation to a power line signal in response to a transmitting-data. A receiving circuit is coupled to detect the phase of the power line signal for generating a data signal and a receiving-data in response to the phase of the power line signal. The receiving circuit further generates a control signal to control power of a load in accordance with the data signal or the receiving-data. The phase modulation is achieved by controlling a turn-on angle of the power line signal. The switch remains in a turn-on state during the normal condition, which achieves good power and low current harmonic. The phase modulation is only performed during the communication of the power management.

10 Claims, 5 Drawing Sheets

US 8,482,391 B2

WALL CONTROL INTERFACE WITH PHASE MODULATION AND DETECTION FOR POWER MANAGEMENT

CROSS-REFERENCE TO RELATED APPLICATION

This application claims the priority benefit of U.S.A. provisional application Ser. No. 61/199,835, filed on Nov. 19, 2008. The entirety of the above-mentioned patent application is hereby incorporated by reference herein and made a part of specification.

BACKGROUND OF THE INVENTION

1. Field of the Invention

The present invention relates to power management, and more particularly to a control circuit of the power management.

2. Description of the Related Art

FIG. 1 shows a traditional approach for controlling an alternating current (AC) power to a load. FIG. 2 shows a waveform of the circuit in FIG. 1. The AC power line $V_{AC}$ is applied to terminal L and N of a power line, which connected to a load 95. A circuit including a thyristor 90 and a phase controller 92 is connected to the power line. The waveform of the power line signal $V_{TR}$ is shown in FIG. 2. The phase modulation controller 92 controls the thyristor 90 to achieve a phase modulation to the power line signal $V_{TR}$. The disadvantages of this traditional approach lie in poor power and high input current harmonic, which causes a high power loss for power transmission. The present invention provides a method and an apparatus to solve this drawback. The proposed interface through the AC power line can be used for ceiling fan control, dimming control of lighting, and so on.

SUMMARY OF THE INVENTION

The present invention provides a wall control interface for power management. The wall control interface includes a switch coupled to an AC power line for controlling a power line signal to a load. A transmitting circuit generates a switching signal to control the switch and achieve a phase modulation to the power line signal in response to a transmitting-data. A receiving circuit is coupled to receive the power line signal for detecting the phase of the power line signal and generating a data signal in response to the phase of the power line signal. The data signal is utilized to generate a receiving-data. The receiving circuit further generates a control signal to control the power of the load in accordance with the data signal or the receiving-data. The transmitting-data is phase modulated by turning on or turning off the power line signal. The receiving-data is generated by the phase detection. The receiving-data is correlated to the transmitting-data. The phase modulation can also be achieved by controlling a turn-on angle of the power line signal. The switch remains in the turn-on state during the normal condition, which accomplishes good power and low input current harmonic. The phase modulation is only performed during the communication of the power management.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 3:
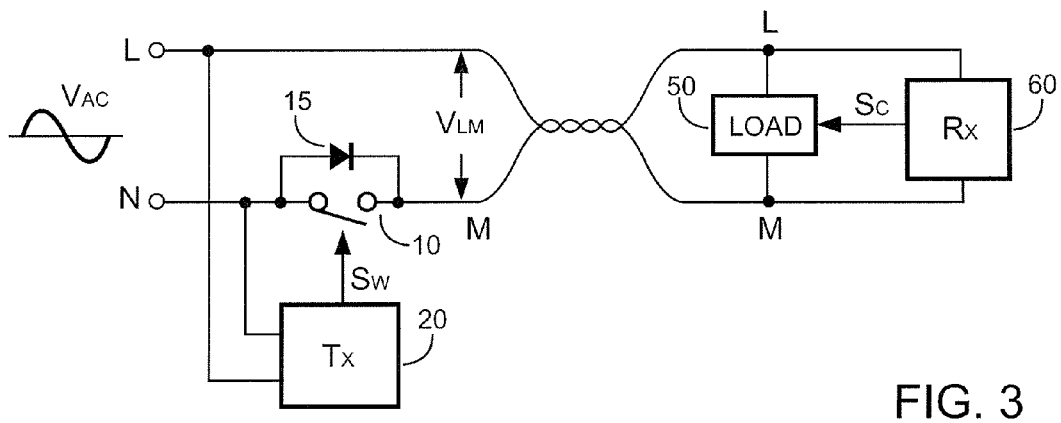
FIG. 3 illustrates an embodiment of a wall control interface in accordance with the present invention.
Figure 6:
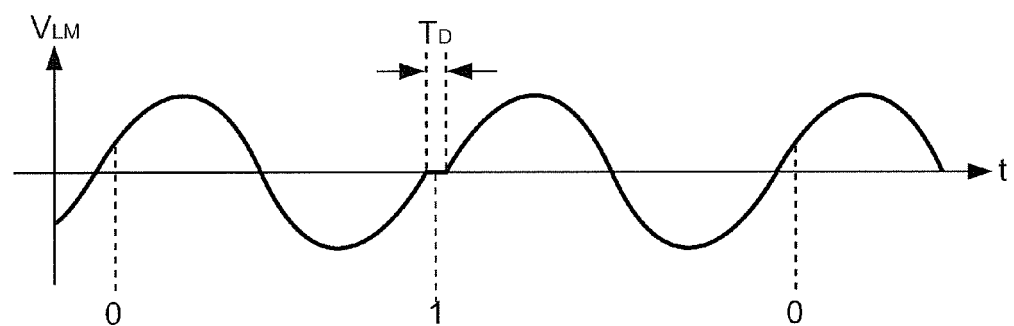
FIG. 6 shows a phase modulation waveform of a power line signal.

FIG. 3 illustrates an embodiment of the present invention. The wall control interface includes a switch 10 coupled to an AC power line $V_{AC}$ for controlling a power line signal $V_{LM}$ to a load 50. The switch 10 can be a metal oxide semiconductor field effect transistor (MOSFET) or an insulated gate bipolar transistor (IGBT), etc. A transmitting circuit 20 generates a switching signal $S_W$ to control the switch 10 and to achieve a phase modulation to the power line signal $V_{LM}$ in response to a transmitting-data (DATA-IN), which is introduced later. A receiving circuit (Rx) 60 is coupled to receive the power line signal $V_{LM}$ for detecting the phase of the power line signal $V_{LM}$ and generating a data signal $D_O$. The data signal $D_O$ is utilized to generate a receiving-data (DATA-OUT). The receiving circuit (Rx) 60 further generates a control signal $S_C$ to control the power of the load 50 in accordance with the data signal $D_O$ or the receiving-data (DATA-OUT). The transmitting-data (DATA-IN) is phase modulated by turning on or turning off the power line signal $V_{LM}$. The data signal $D_O$ and the receiving-data (DATA-OUT) is generated by the phase detection. The receiving-data (DATA-OUT) is correlated to the transmitting-data (DATA-IN). FIG. 6 is the waveform of the power line signal $V_{LM}$. It shows the phase modulation is achieved by controlling a turn-on angle of the power line signal $V_{LM}$. The switch 10 (show in FIG. 3) remains in the turn-on state during the normal condition, which accomplishes good power and low input current harmonic for the power line. The phase modulation is only performed during the communication for parameters setting and power management.

Figure 4:
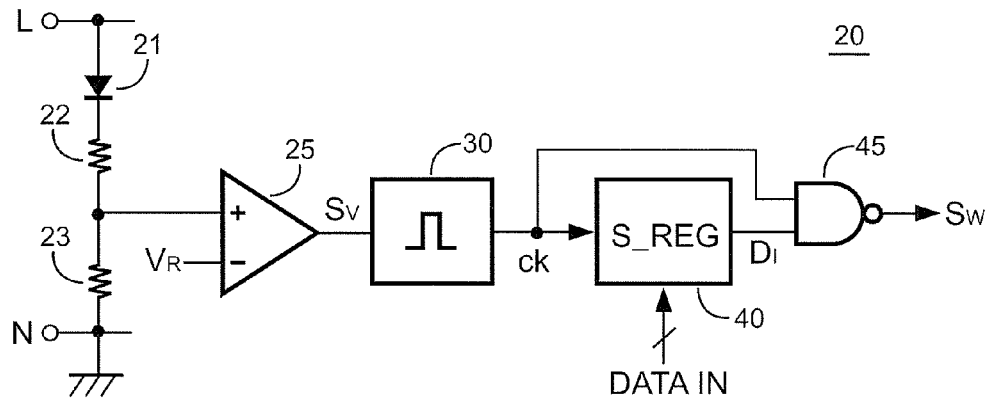
FIG. 4 is a schematic view of a transmitting circuit in accordance with the present invention.

FIG. 4 is a schematic view of the transmitting circuit 20 of an embodiment of the invention. The transmitting circuit 20 includes an input circuit coupled to the AC power line $V_{AC}$ for generating a zero-crossing signal $S_V$. Register device (S_REG) 40 is used for storing the transmitting-data (DATA-IN) and generating a signal $D_I$. An output circuit formed by an NAND gate 45 is used for generating the switching signal $S_W$. The switching signal $S_W$ is coupled to control the switch 10 in response to the transmitting-data (DATA-IN) and the zero-crossing signal $S_V$. The input circuit of the transmitting circuit 20 includes a comparator 25, a diode 21 and a voltage divider developed by resistors 22 and 23. The input circuit is coupled to the AC power line $V_{AC}$ to generate an input signal $S_{IN}$. The input signal $S_{IN}$ is connected to a comparator 25 to generate the zero-crossing signal $S_V$. The zero-crossing signal $S_V$ is generated by comparing the input signal $S_{IN}$ with a reference signal $V_R$. A clock generator 30 generates a clock signal CK in response to the zero-crossing signal $S_V$. The clock signal CK is coupled to clocking the register device (S_REG) 40. The output circuit generates the switching signal $S_W$ in response to the signal $D_I$ and the clock signal CK.

Figure 5:
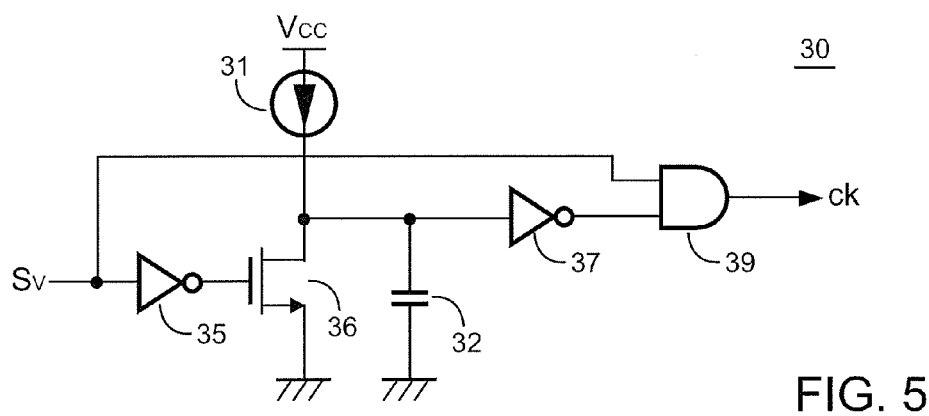
FIG. 5 shows an exemplary circuit of a clock generator in accordance with the present invention.

FIG. 5 is an exemplary circuit of the clock generator 30 of an embodiment of the invention. A current source 31 is coupled to charge a capacitor 32. A transistor 36 is connected to the capacitor 32 for the discharge. The on/off of the transistor 36 is controlled by the zero-crossing signal $S_V$ through an inverter 35. An inverter 37 is connected to the capacitor 32. The output of the inverter 37 and the zero-crossing signal $S_V$ are connected to an AND gate 39 for generating the clock signal CK. The clock signal CK is thus generated in response to a rising edge of the zero-crossing signal $S_V$.

FIG. 6 shows the waveform of the phase modulation of the power line signal $V_{LM}$. The turn-on angle of the power line signal $V_{LM}$ is controlled by the pulse width $T_D$ of the clock signal CK of the clock generator 30 when the transmitting-data (DATA-IN) is logic one (1). The pulse width $T_D$ is determined by the current of the current source 31 and the capacitance of the capacitor 32 (show in FIG. 5).

Figure 7:
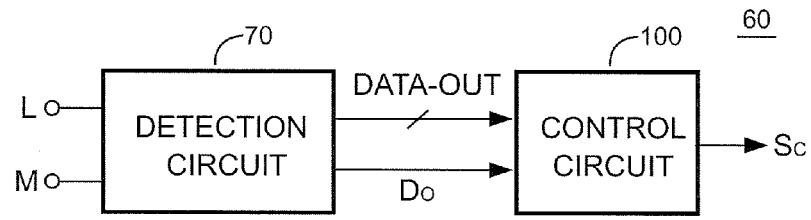
FIG. 7 is a schematic block of a receiving circuit in accordance with the present invention.
Figure 8:
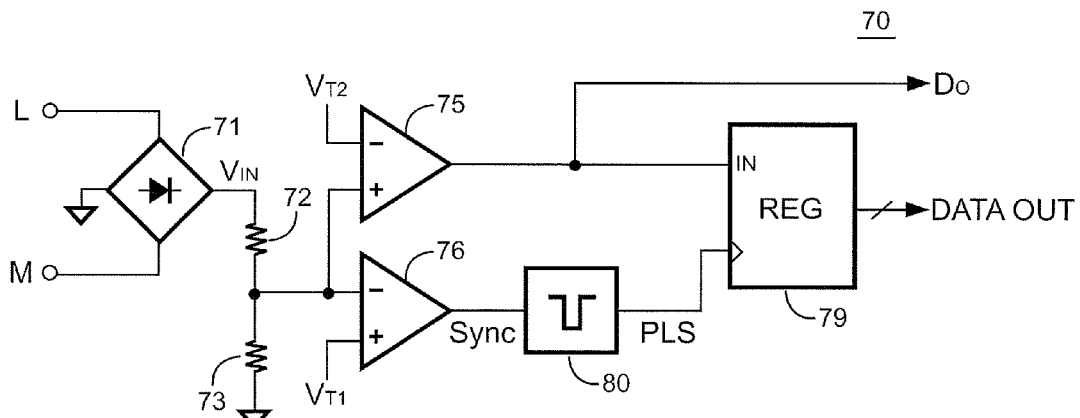
FIG. 8 illustrates an embodiment of a phase-detection circuit in accordance with the present invention.

FIG. 7 shows the receiving circuit 60 of an embodiment of the invention. The receiving circuit 60 includes a phase-detection circuit 70 and a control circuit 100 for generating the control signal $S_C$. The phase-detection circuit 70 generates the data signal $D_O$ and the receiving-data (DATA-OUT) after the phase detection. The control circuit 100 generates the control signal $S_C$ in response to the data signal $D_O$ or/and the receiving-data (DATA-OUT). FIG. 8 illustrates an embodiment of the phase-detection circuit 70. The phase-detection circuit 70 is coupled to receive the power line signal $V_{LM}$ for generating a data signal $D_O$ and a synchronous signal SYNC. The phase-detection circuit 70 generates the receiving-data (DATA-OUT) in accordance with the data signal $D_O$ and the synchronous signal SYNC. The synchronous signal SYNC is generated in response to the zero crossing of the power line signal $V_{LM}$. The phase-detection circuit 70 includes a rectifier 71 and an attenuator developed by resistors 72 and 73. The attenuator is coupled to receive the power line signal $V_{LM}$ through the rectifier 71 for generating an attenuated signal $S_{ATT}$ coupled to comparators 75 and 76. The comparators 75 and 76 receive the attenuated signal $S_{ATT}$ and a first threshold $V_{T1}$ and a second threshold $V_{T2}$ respectively for generating the data signal $D_O$ and the synchronous signal SYNC respectively. The rectifier 71 can be a bridge rectifier. The rectifier 71 is coupled to receive the power line signal $V_{LM}$ for generating an rectification signal $V_{IN}$. A pulse generation circuit 80 generates a pulse signal PLS in response to the synchronous signal SYNC. The pulse signal PLS and the data signal $D_O$ are coupled to a register device (REG) 79 for generating the receiving-data (DATA-OUT).

Figure 9:
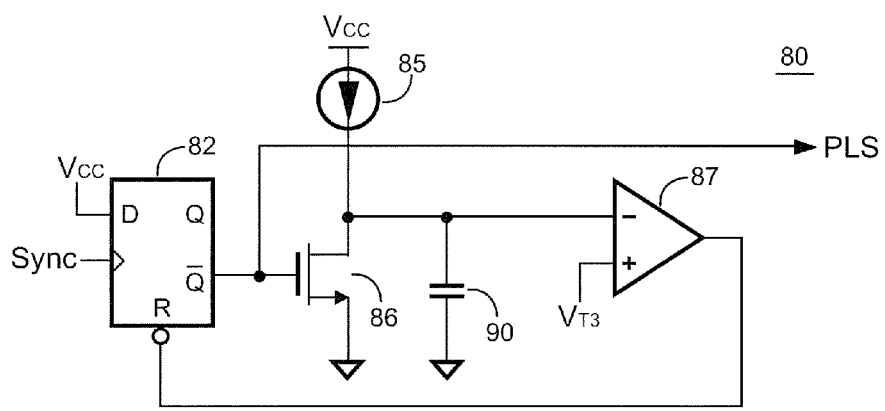
FIG. 9 shows an embodiment of a pulse generation circuit in accordance with the present invention.

FIG. 9 shows an embodiment of the pulse generation circuit 80. A current source 85 is coupled to charge a capacitor 90. A transistor 86 is connected to the capacitor 90 for the discharge. A flip-flop 82 generates the pulse signal PLS. The on/off of the transistor 86 is controlled by the pulse signal PLS. The synchronous signal SYNC is coupled to turn on the flip-flop 82. A comparator 87 is connected to the capacitor 90 and a third threshold $V_{T3}$. The output of the comparator 87 is coupled to reset the flip-flop 82. The pulse signal PLS is thus generated in response to the rising edge of the synchronous signal SYNC.

Figure 10:
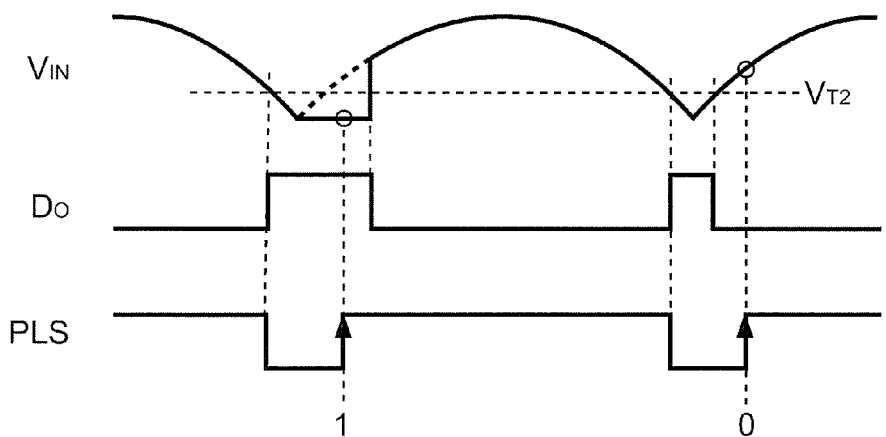
FIG. 10 shows waveforms in which a data signal is generated in response to a turn-on angle of the power line signal and a rising edge of a pulse signal.

FIG. 10 shows the data signal $D_O$ is correlation to the turn-on angle of the power line signal $V_{LM}$ and the rising edge of the pulse signal PLS. The pulse signal PLS indicates the availability of the data signal $D_O$ from the power line signal $V_{LM}$. The power line signal $V_{LM}$ is correlation to the rectification signal $V_{IN}$.

Figure 11:
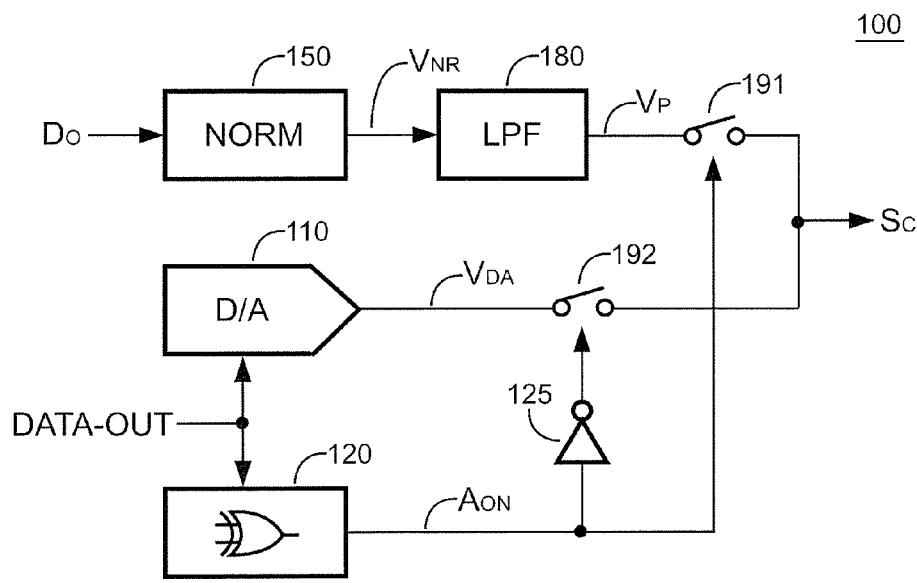
FIG. 11 illustrates an embodiment of a control circuit in accordance with the present invention.

FIG. 11 is a schematic block of the control circuit 100 of an embodiment of the invention. The control circuit 100 includes a digital-to-analog converter (D/A) 110 for generating a first control signal $V_{DA}$ in accordance with the receiving-data (DATA-OUT). A normalization circuit (NORM) 150 generates a normalized signal $V_{NR}$ in response to the data signal $D_O$. A low-pass filter (LPF) 180 generates a second control signal $V_P$ in accordance with the pulse width of the normalized signal $V_{NR}$. The normalized signal $V_{NR}$ is a digital signal. A value of a high-state of the normalized signal $V_{NR}$ is set as a constant, which helps to generate an accurate value of the second control signal $V_P$ through the low-pass filter (LPF) 180. A comparator 120 generates a channel-control signal $A_{ON}$ in accordance with the receiving-data (DATA-OUT), wherein the comparator 120 can be formed by a digital comparator. The output of output switches 192 and 191 are connected together to generate the control signal $S_C$ from the first control signal $V_{DA}$ or the second control signal $V_P$. The output switches 192 and 191 are controlled by the channel-control signal $A_{ON}$. For example, the channel-control signal $A_{ON}$ is set as logic one to enable the second control signal $V_P$ as the control signal $S_C$ when the receiving-data (DATA-OUT) are all logic one (111••11).

Figure 12:
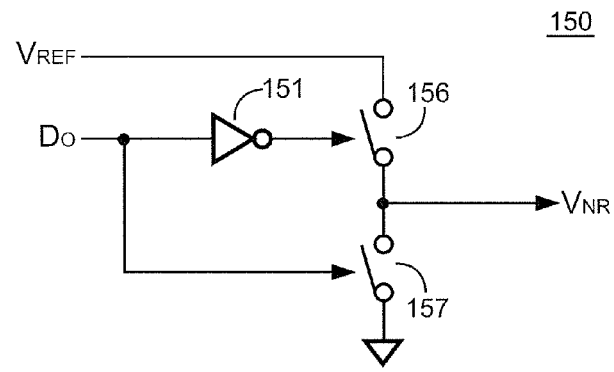
FIG. 12 is a schematic view of a normalization circuit in accordance with the present invention.

FIG. 12 is a schematic view of a normalization circuit 150 of an embodiment of the invention. The normalization circuit 150 including switches 156 and 157 connected together to generate the normalized signal $V_{NR}$. The other terminal of the switch 156 is connected to a constant signal $V_{REF}$. The other terminal of the switch 157 is connected to the ground. The switch 157 is controlled by the data signal $D_O$. The switch 156 is controlled by the data signal $D_O$ via an inverter 151.

Figure 1:
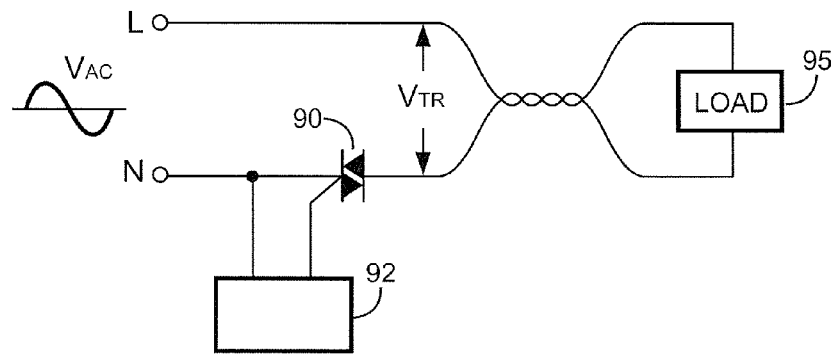
FIG. 1 is a traditional power control circuit.
Figure 2:
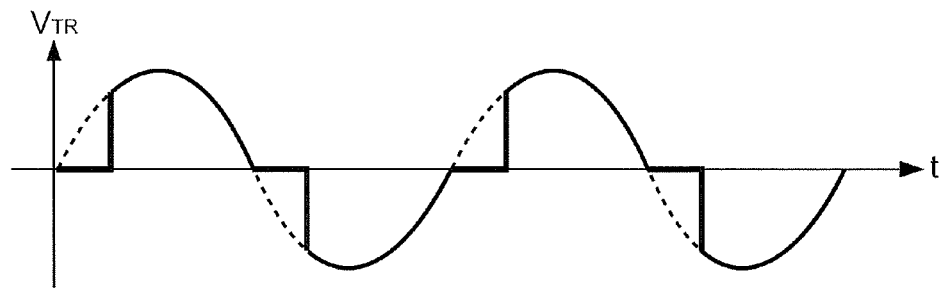
FIG. 2 shows a waveform of a circuit in FIG. 1.
Figure 13:
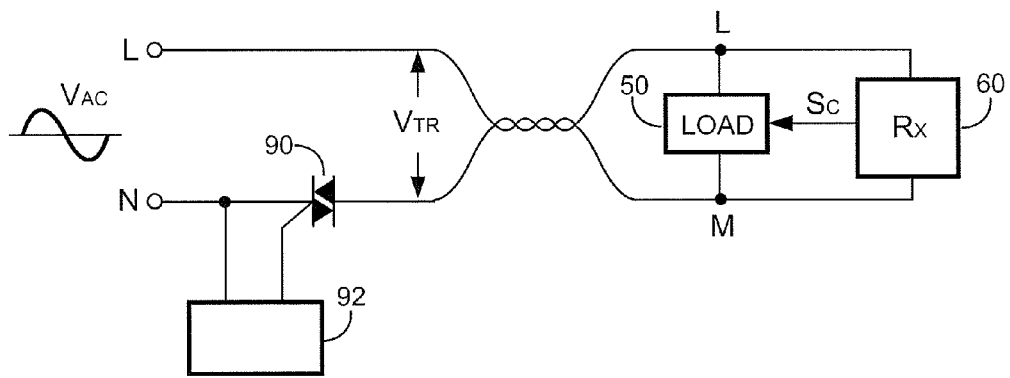
FIG. 13 shows the receiving circuit connected to a traditional power control circuit for the power management.
Figure 14:
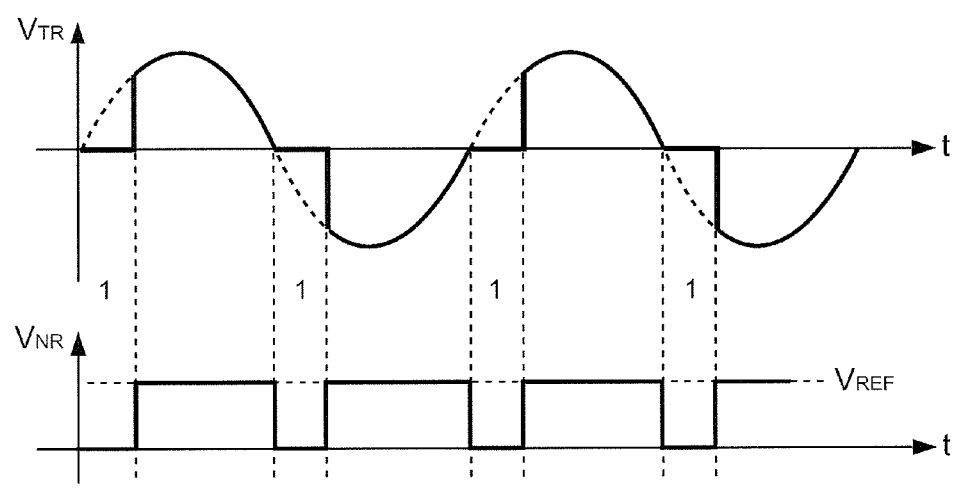
FIG. 14 shows waveforms of the circuit in FIGS. 12 and 13.

FIG. 13 shows the receiving circuit 60 connected to a traditional power control circuit for the power management. The receiving circuit 60 generates the control signal $S_C$ from the second control signal $V_P$ in accordance with the pulse width of the normalized signal $V_{NR}$, as shown in FIG. 11. The pulse width of the normalized signal $V_{NR}$ is correlated to the duty cycle of the power line signal $V_{TR}$ shown in FIG. 13. The waveforms of the power line signal $V_{TR}$ and the normalized signal $V_{NR}$ are shown in FIG. 14. When the receiving-data (DATA-OUT) are all logic 1, the comparator 120 (shown in FIG. 1) generates the channel-control signal $A_{ON}$ to set the control signal $S_C$ as the second control signal $V_P$. The normalized signal $V_{NR}$ is a digital signal and the high level of normalized signal $V_{NR}$ is correlation to the constant signal $V_{REF}$.

Additional, the receiving circuit 60 can only generates the receiving-data (DATA-OUT), when the receiving circuit 60 is applied to the power management. Another, the receiving circuit 60 can only generates the data-signal Do, when receiving circuit 60 is applied to the receiving control circuit for a wall control.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A wall control interface, comprising:
    a switch, coupled to an AC power line for controlling a power line signal to a load;
    a transmitting circuit, generating a switching signal to control the switch and achieve a phase modulation to the power line signal in response to a transmitting-data; and
    a receiving circuit, coupled to receive the power line signal for detecting the phase of the power line signal and generating a data signal and a receiving-data in response to the phase of the power line signal, wherein the receiving circuit further generates a control signal to control power of the load in accordance with the data signal or the receiving-data, and the transmitting-data is phase modulated by turning on/off the power line signal, the receiving-data being generated by the phase detection and correlated to the transmitting-data.

2. The wall control interface as claimed in claim 1, wherein the phase modulation is achieved by controlling a turn-on angle of the power line signal.

3. The wall control interface as claimed in claim 1, wherein the transmitting circuit comprises:
    an input circuit, coupled to the AC power line for generating a zero-crossing signal;
    a register device, storing the transmitting-data; and
    an output circuit, generating the switching signal coupled to control the switch in response to the transmitting-data and the zero-crossing signal.

4. The wall control interface as claimed in claim 1, the receiving circuit comprising:
    a phase-detection circuit, coupled to receive the power line signal for generating the data signal and a synchronous signal, the receiving circuit generating the receiving-data in accordance with the data signal and the synchronous signal; and
    a control circuit, coupled to receive the data signal and the receiving-data for generating the control signal coupled to control the power of the load,
    wherein the synchronous signal is generated in response to the zero crossing of the power line signal, and the data signal is generated in response to the turn-on angle of the power line signal.

5. The wall control interface as claimed in claim 1, wherein the switch is a metal oxide semiconductor field effective transistor (MOSFET) or an insulated gate bipolar transistor (IGBT).

6. The wall control interface as claimed in claim 4, the control circuit comprising:
    a digital-to-analog converter, generating a first control signal in accordance with the receiving-data;
    a normalization circuit and a low-pass filter, generating a second control signal in accordance with the data signal;
    a comparator, generating a channel-control signal in accordance with the receiving-data; and
    output switches, coupled to the first control signal and the second control signal to generate the control signal in accordance with the first control signal or the second control signal,
    wherein the output switches are controlled by the channel-control signal.

7. A power management interface, comprising:
    a switch, coupled to an AC power line for controlling a power line signal to a load;
    a transmitting circuit, generating a switching signal to control the switch and achieve a phase modulation to the power line signal in response to a transmitting-data; and
    a receiving circuit, coupled to receive the power line signal for detecting the phase of the power line signal and generating a receiving-data, wherein the receiving circuit further generates a control signal to control power of the load in accordance with the receiving-data, and the transmitting-data is phase modulated by turning on/off the power line signal, the receiving-data being generated by the phase detection and correlated to the transmitting-data.

8. The power management interface as claimed in claim 7, wherein the phase modulation is achieved by controlling a turn-on angle of the power line signal.

9. The power management interface as claimed in claim 7, wherein the transmitting circuit comprises:
    an input circuit, coupled to the AC power line for generating a zero-crossing signal;
    a register device, storing the transmitting-data; and
    an output circuit, generating the switching signal coupled to control the switch in response to the transmitting-data and the zero-crossing signal.

10. The power management interface as claimed in claim 7, the receiving circuit comprising:
    a phase-detection circuit, coupled to receive the power line signal for generating a data signal and a synchronous signal, the receiving circuit generating the receiving-data in accordance with the data signal and the synchronous signal,
    a control circuit, generating the control signal coupled to control the power of the load,
    wherein the synchronous signal is generated in response to the zero crossing of the power line signal, and the data signal is generated in response to the turn-on angle of the power line signal.

* * * * *